J. Simpson
Cultivator.
No. 96,979.  Patented Nov. 16, 1869.
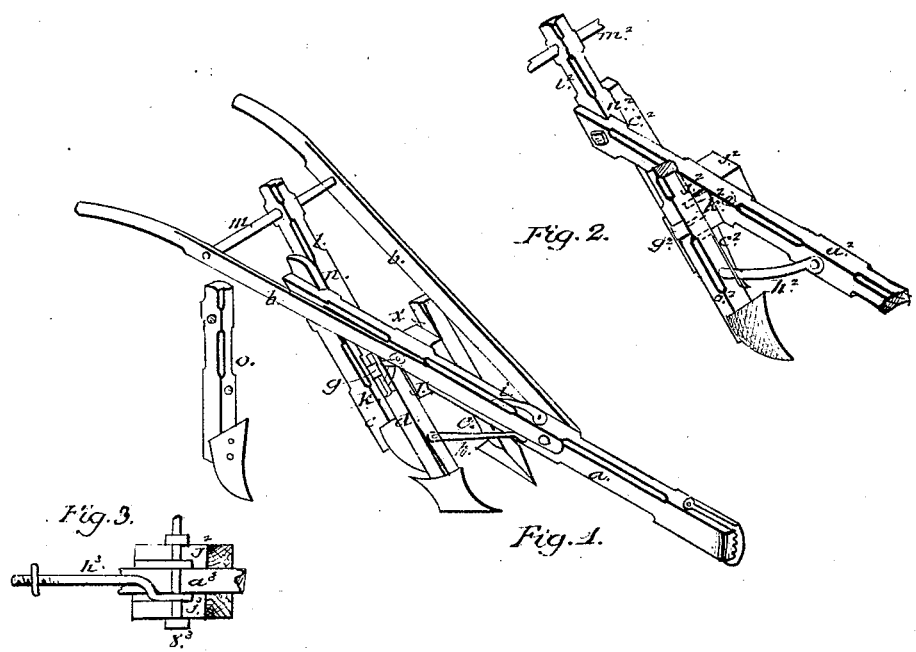
Witnesses:
Frank Gunnell
W. L. Carroll
Inventor:
James Simpson

UNITED STATES PATENT OFFICE.

JAMES SIMPSON, OF CORDOVA, ILLINOIS.

IMPROVEMENT IN CULTIVATORS.

Specification forming part of Letters Patent No. 96,979, dated November 16, 1869.

*To all whom it may concern:*

Be it known that I, JAMES SIMPSON, of Cordova, in the county of Rock Island and State of Illinois, have invented certain new and useful Improvements in a Cultivator; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

Figure 1 is an isometrical view of my invention, showing it with the plows attached. Fig. 2 is an isometrical view of the lower part, showing the plows removed and the shovel attached. Fig. 3 is a reversible stay-rod secured to the stem of the rear shovel and the beam.

Similar letters of reference indicate corresponding parts in the three figures.

$a\ a^2\ a^3$ is the beam; $b$, the handles; $c\ c^2$, the rear shovel and stem; $d$, the right-hand plow and stem; $e$, the left-hand plow and stem.

$f$ are long mortises in the top of plow-stems $d$ and $e$, through which the stems are bolted to the plow-beam, as shown at $g\ g^2$. $h\ h^2$ is the stay-rod secured to the beam $a\ a^2$, and passing through the plow-stem. $i$ is another stay-rod (shown in dotted lines) secured to the beam $a\ a^2$ and plow-stem $e$. The stay-rods have nuts and screws on the rear ends to regulate the position of the plows $d$ and $e$ when they are raised or lowered.

$j\ j^2\ j^3$ are blocks placed between the plow-stems, each side of the beam $a\ a^2$ used for keeping the plows the proper distance apart.

$k\ k^2\ k^3$ shows a reversible stay-rod secured to the shovel-stem $c\ c^2$ and to the bolt $g\ g^2$.

$l\ l^2$ is the upper part of the shovel-stem $c\ c^2$, and is movable on round $m\ m^2$.

$n\ n^2$ shows where the shovel-stem $c\ c^2$ and $l\ l^2$ lap together, and are bolted to rear end of beam $a\ a^2$.

$o\ o^2$ is a portable shovel and stem, designed to take the place of the plow and stem $d$, and then the plow and stem $e$ are removed, and in this case the shovel-stem $c\ c^2$ is moved to the left its thickness, and the upper part of the stem $l\ l^2$ is moved to the right its thickness—that is, they reverse positions—and the reversible stay-rod $k\ k^2\ k^3$ is changed to the other side of the beam $a\ a^2$. Thus my invention becomes a shovel-cultivator, as shown in Fig. 2, to be used for stirring and loosening the soil.

The invention, as shown in Fig. 1, is designed to be used when deep plowing is required, and when the soil is to be thrown upon the rows both ways at one time, while the shovel $c\ c^2$ levels the earth left in the center of the rows.

Let plow and stem $e$ take the place of the plow and stem $d$, then my invention is in shape for throwing the soil away from the rows at the same time.

Remove the plow and stem $e$ and leave plow and stem $d$, Fig. 1, as shown, and leave shovel $c\ c^2$ in position, as shown in Fig. 2, then I have a cultivator with a shovel and plow combined, and by the whole arrangement I have a changeable cultivator that can be used at the different stages of the growth of the corn or vegetables, also at the different degrees of hardness of the soil, and a cultivator that is very simple in its construction, light, and easily handled.

Having thus described my invention, what I claim is—

1. The combination of the adjustable plows $d$ and $e$, and the shovel $c$, with the beam $a$ and handles $b$, all arranged as described.

2. The detachable shovel $c$, and the adjustable stem $l$, constructed and applied to the beam as herein set forth.

3. The reversible brace-rod $h^3$, in combination with recessed and detachable blocks $j^3$, arranged to operate as described.

JAMES SIMPSON.

Witnesses:
M. R. METZGAR,
WILSON FLEMING.